United States Patent
Abe et al.

(10) Patent No.: US 8,662,572 B2
(45) Date of Patent: Mar. 4, 2014

(54) VEHICLE-BODY FRONT STRUCTURE

(71) Applicant: Honda Motor Co., Ltd., Tokyo (JP)

(72) Inventors: Yuuya Abe, Wako (JP); Kiyohito Koizumi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/723,978

(22) Filed: Dec. 21, 2012

(65) Prior Publication Data

US 2013/0161979 A1 Jun. 27, 2013

(30) Foreign Application Priority Data

Dec. 27, 2011 (JP) ................................ 2011-285358

(51) Int. Cl.
*B62D 21/02* (2006.01)

(52) U.S. Cl.
USPC .................................................. 296/203.02

(58) Field of Classification Search
USPC ............. 296/203.02, 187.03, 187.08, 187.09, 296/193.1, 193.09, 115, 117; 180/68.4, 180/68.6, 274; 280/784
See application file for complete search history.

(56) References Cited

U.S. PATENT DOCUMENTS

| | | | | |
|---|---|---|---|---|
| 7,237,635 | B2 * | 7/2007 | Khouw et al. | 180/68.3 |
| 7,461,890 | B2 * | 12/2008 | Yatsuda | 296/203.02 |
| 2011/0304176 | A1 * | 12/2011 | Kihara et al. | 296/193.09 |

FOREIGN PATENT DOCUMENTS

| | | |
|---|---|---|
| JP | 4-027675 A | 1/1992 |
| JP | 2005-047324 A | 2/2005 |
| JP | 2005-349924 A | 12/2005 |
| JP | 2006-192983 A | 7/2006 |
| JP | 2007-237889 A | 9/2007 |
| JP | 2007-331440 A | 12/2007 |
| JP | 2008-068689 A | 3/2008 |
| JP | 2008-132960 A | 6/2008 |

* cited by examiner

*Primary Examiner* — Joseph Pape
*Assistant Examiner* — Dana Ivey
(74) *Attorney, Agent, or Firm* — Westerman, Hattori, Daniels & Adrian, LLP

(57) ABSTRACT

A vehicle-body front structure includes a rectangular bulkhead that supports a radiator that is provided in a front part of a vehicle body. The bulkhead includes a pair of bulkhead side members arranged at both sides of the bulkhead and extending in a vehicle up-down direction, and a bulkhead lower member arranged at lower ends of the bulkhead side members and extending in a vehicle width direction. The bulkhead lower member has a smaller length than a distance between the pair of bulkhead side members. The bulkhead lower member includes a pair of extensions being respectively hung between the bulkhead lower member and the bulkhead side members in the vehicle width direction. The bulkhead lower member is joined to inner sides of the pair of extensions such that the extensions are hung in a vehicle front-rear direction.

5 Claims, 16 Drawing Sheets

VEHICLE-BODY FRONT STRUCTURE

CROSS REFERENCES TO RELATED APPLICATIONS

The present application claims priority under 35 U.S.C. §119 to Japanese Patent Application No. 2011-285358, filed Dec. 27, 2011, entitled "Vehicle-body Front Structure." The contents of this application are incorporated herein by reference in their entirety.

TECHNICAL FIELD

The present application relates to a vehicle-body front structure including a rectangular bulkhead that supports a vehicle part such as a radiator that is provided in a front part of a vehicle body.

BACKGROUND

There is a vehicle-body front structure in which a cross-member is coupled between front end portions of left and right front side members, radiator core sides are respectively provided between the front end portions of the left and right front side members and left and right both end portions of a radiator core upper, and the radiator core upper (a bulkhead lower) is provided to connect lower ends of the radiator core sides.

With this vehicle-body front structure, the bulkhead lower is divided into radiator core side connection portions and a bulkhead lower body portion. The shape of the bulkhead lower can be simplified (for example, see Japanese Unexamined Patent Application Publication No. 4-27675).

There may be a vehicle-body front structure in which, when an external force acts from the vehicle front side, a heat exchanger that is arranged at the vehicle front side is allowed to move to the vehicle rear side by a predetermined distance while the support state of the heat exchanger with respect to the vehicle body is maintained.

With this vehicle-body front structure, a lower end of a radiator is supported by a flange that extends from a bulkhead to the front side, and when a front collision occurs, the radiator can move to the rear side (for example, see Japanese Unexamined Patent Application Publication No. 2008-132960).

There may be a vehicle-body front structure in which a bracket protrudes from a radiator core support in the vehicle front-rear direction, and a vehicle mount pin of a heat exchanger is fixed to a fixing hole of the bracket.

With this vehicle-body front structure, a lower end of a radiator is supported by a flange that extends to the front side from a bulkhead, and the heat exchanger can be mounted at the vehicle front side or the vehicle rear side (for example, see Japanese Unexamined Patent Application Publication No. 2008-68689).

There may be a vehicle-body front structure including a radiator support upper that is arranged in an upper portion of an engine room extending in the vehicle width direction and supports an upper portion of a heat exchanger, and a radiator support lower that is arranged in a lower portion of the engine room and has a support surface for supporting the heat exchanger, the support surface being recessed to the vehicle lower side.

With this vehicle-body front structure, any of a large radiator and a small radiator can be mounted on the vehicle body by adjusting the depth of the recess of the support surface (for example, see Japanese Unexamined Patent Application Publication No. 2007-331440).

There may be a vehicle-body front structure including a radiator core support (a bulkhead) to which two types of heat exchangers including a radiator and a condenser arranged in the vehicle front-rear direction can be attached.

With this vehicle-body front structure, an additional bracket is provided for supporting a lower end of the radiator, and can provide various support forms of the heat exchangers (for example, see Japanese Unexamined Patent Application Publication No. 2005-349924).

There may be a vehicle-body front structure including a radiator core support (a bulkhead) configured to fix in a surrounding manner a support pin protruding from an upper end portion of a heat exchanger (a radiator) by an upper bracket provided at the radiator core support and a cap that is inserted into and fixed to the upper bracket in the front-rear direction. Also, an additional bracket is provided for supporting a lower end of the radiator.

With this vehicle-body front structure, various support forms for the heat exchanger can be provided. Also, since the support pin of the heat exchanger (the radiator) is fixed in a surrounding manner, the radiator can be easily detached (for example, see Japanese Unexamined Patent Application Publication No. 2007-237889).

There may be a vehicle-body front structure in which both sides of a radiator panel that holds a radiator are fixed to a pair of left and right side frames extending in the front-rear direction of a vehicle body, and both the ends of the radiator panel are coupled through reinforcing members extending in the vehicle width direction.

With this vehicle-body front structure, bulkhead sides of the radiator panel (a bulkhead) each are formed in an L shape, and hence by removing a center portion of a bulkhead lower, the weight of the vehicle body can be reduced (for example, see Japanese Unexamined Patent Application Publication No. 2006-192983).

There may be a vehicle-body front structure including left and right front side frames extending in the front-rear direction along wheel aprons that form side walls of an engine room, and a frame-shaped front end member (a bulkhead) that supports a radiator at front portions of the left and right front side frames. A bulkhead lower of the bulkhead is formed in a vertically overlaid manner.

With this vehicle-body front structure, the rigidity of the bulkhead can be provided (for example, see Japanese Unexamined Patent Application Publication No. 2005-47324).

With the vehicle-body front structure described in Japanese Unexamined Patent Application Publication No. 4-27675, the bulkhead lower is divided. However, since the bulkhead lower is divided, divided parts desirably have an added value such as providing rigidity that is proper for operation stability.

With the vehicle-body front structure described in any of Japanese Unexamined Patent Application Publication No. 2008-132960 and No. 2008-68689, the lower end of the radiator is supported by the flange extending to the front side from the bulkhead lower. However, if the lower end of the radiator is supported by the flange, a proper stroke for absorbing an impact load cannot be provided. In particular, if a large radiator is used and a condenser is provided at the front of the radiator, the above-described phenomenon more likely occurs.

With the vehicle-body front structure described in Japanese Unexamined Patent Application Publication No. 2007-331440, the recess for adjusting the height of the radiator is provided at the bulkhead lower. However, a second moment of area decreases at the portion of the bulkhead lower provided with the recess for adjusting the height of the radiator. The bulkhead lower is likely affected by bending deformation, and it is difficult to provide the rigidity of the bulkhead.

With the vehicle-body front structure described in any of Japanese Unexamined Patent Application Publication No. 2005-349924 and No. 2007-237889, the additional bracket is provided for supporting the lower end of the radiator. However, if the additional bracket is provided, this may increase the number of parts.

With the vehicle-body front structure described in Japanese Unexamined Patent Application Publication No. 2006-192983, the bulkhead sides each are formed in the L shape. However, if the bulkhead sides each are formed in the L shape and the radiator is supported by the L-shaped portions, a phenomenon may occur in which the L-shaped portions may be opened. Hence, the operation stability of the vehicle may be degraded.

With the vehicle-body front structure described in Japanese Unexamined Patent Application Publication No. 2005-47324, the bulkhead lower is vertically overlaid. However, if the bulkhead lower is vertically overlaid, the weight of the bulkhead may increase.

In the past, a sub-frame for supporting an engine was directly fixed and fastened to a frame member in the up-down direction, and thus the rigidity of the vehicle body was provided. The rigidity of the front portion of the engine was provided by the cross member at the front side of the rectangular sub-frame to prevent the operation stability from being affected by a road-surface condition during driving, and the rigidity of the bulkhead lower was not required to be so high.

However, in recent years, multiple engine types are frequently set by an expansion of variety of needs. In particular, if an engine with a large magnitude of oscillation, such as a V-6 engine is mounted, the sub-frame for supporting the engine is not directly fastened to the frame member in view of restriction in transmission of a vibration, but is attached through a mount, such as a rubber bush. It is difficult to provide the rigidity of the vehicle body at the front part of the vehicle body required for the operation stability by the sub-frame.

Meanwhile, various drive loads act during driving. In particular, a load in the left-right direction is input to the lower end portion of the bulkhead. To prevent the loads from affecting the operation stability, the bulkhead lower has to have a proper sectional area. Also, the vibration has to be reduced such that the frequency specific to the vehicle body is changed by providing the proper rigidity and resonance with the oscillation of the engine is avoided.

Further, if the load in the left-right direction is input to the bulkhead lower, it is known that the front wall of the bulkhead lower is pushed to the front side, a moment acts entirely on the bulkhead so as to reciprocate from an obliquely upper front side to an obliquely lower rear side, and a phenomenon in which a closed section formed by a hat section and its upper lid is deformed (called opening phenomenon) occurs.

That is, there is desired a structure that restricts the generation of vibration while providing the operation stability and that can handle change in size of a radiator caused by change of an engine by providing a radiator support function originally intended for a bulkhead, without an increase in number of parts or an increased in number of manufacturing steps.

SUMMARY

It is desirable to provide a vehicle-body front structure that prevents an opening phenomenon from occurring at a closed section of a member forming a bulkhead, and can provide a rigidity for operation stability.

Also, it is desirable to provide a vehicle-body front structure that can avoid resonance with an engine oscillation frequency and hence can restrict vibration.

Further, it is desirable to provide a vehicle-body front structure that can be easily adjusted in the height direction depending on the size of a radiator without an additional member.

Further, it is desirable to provide a vehicle-body front structure that can maintain a sectional area for providing a rigidity for operation stability.

According to an aspect, there is provided a vehicle-body front structure including a rectangular bulkhead that supports a radiator that is provided in a front part of a vehicle body. The bulkhead includes a pair of bulkhead side members arranged at both sides of the bulkhead and extending in a vehicle up-down direction, and a bulkhead lower member arranged at lower ends of the bulkhead side members and extending in a vehicle width direction. The bulkhead lower member has a smaller length than a distance between the pair of bulkhead side members. The bulkhead lower member includes a pair of extensions being respectively hung between the bulkhead lower member and the bulkhead side members in the vehicle width direction. The bulkhead lower member supports the radiator at both ends of the bulkhead lower member. The bulkhead lower member is joined to inner sides of the pair of extensions such that the extensions are hung in a vehicle front-rear direction.

The bulkhead lower member supports the radiator at both the ends of the bulkhead lower member, and is joined to the inner sides of the extensions such that the extensions are hung in the vehicle front-rear direction. Accordingly, the opening phenomenon can be prevented, and the rigidity for the operation stability can be provided. In addition, the specific vibration frequency of the front part of the vehicle body is changed by increasing the rigidity of the entire bulkhead and hence the resonance with the engine oscillation frequency is avoided. Accordingly, the vibration can be restricted. Further, the bulkhead lower member supports the radiator at the outer ends of the bulkhead lower member. Accordingly, the adjustment in the height direction can be easily performed depending on the size of the radiator without an additional member. Also, a recess with respect to the upper side is not provided at the bulkhead lower member or the bottom surfaces of the extensions. Accordingly, the sectional area that can provide the rigidity for the operation stability can be maintained.

Preferably according to the aspect, the bulkhead lower member may have a closed section that is formed by a body portion that has a U shape in sectional view, and a lid that closes the body portion from an upper side. The bulkhead lower member may include radiator support portions that extend from both the ends of the bulkhead lower member to outer sides in the vehicle width direction and that support the radiator. The radiator support portions may be joined to both the body portion and the extensions.

The bulkhead lower member has the closed section formed by the body portion and the lid, and the radiator support portions are joined to both the body portion and the extensions at three members (three layers). Accordingly, a high rigidity can be provided, and the advantages according to the aspect can be further attained.

Also, the closed section is formed by the lid that closes the body portion from the upper side, and the radiator support portions that extend from both the ends of the bulkhead lower member to the outer sides in the vehicle width direction and that support the radiator are formed. Accordingly, the number of parts can be reduced as compared with a case in which the radiator support portions are formed of additional parts.

Preferably according to the aspect, the extensions each may have a U shape in sectional view and are joined to cover the body portion from a lower side. The extensions may be arranged at the bulkhead lower member to be substantially horizontal to the bulkhead lower member in front view.

Accordingly, even when a layout has no space at the front and rear of the bulkhead, the advantages according to the aspect can be attained.

Preferably according to the aspect, each of the extensions may include a rear wall vertically arranged at a vehicle rear side, and a substantially triangular extending portion arranged at an outer side in the vehicle width direction of the rear wall, the extending portion being joined to a vehicle rear side of the corresponding bulkhead side member.

Accordingly, without a reinforcing member of an additional part, which is obliquely hung between the bulkhead side member and the bulkhead lower member, the advantages according to the aspect can be attained.

Preferably according to the aspect, each of the bulkhead side member may include a stiffener that is joined to an outer side in the vehicle width direction. Each of the extensions may include a stiffener support portion that extends to the outer side in the vehicle width direction of the bulkhead side member and supports the stiffener by an upper surface. The stiffener may include a bottom surface that is joined to the upper surface of the stiffener support portion, and a side surface that is joined to the outer side in the vehicle width direction of the bulkhead side member.

The bottom surface and the side surface of the stiffener are joined to the stiffener support portion of the extension and to the outer side in the vehicle width direction of the bulkhead side member. Accordingly, the advantages according to the aspect can be further attained.

BRIEF DESCRIPTION OF THE DRAWINGS

The advantages of the disclosure will become apparent in the following description taken in conjunction with the following drawings.

DETAILED DESCRIPTION

Figure 1:
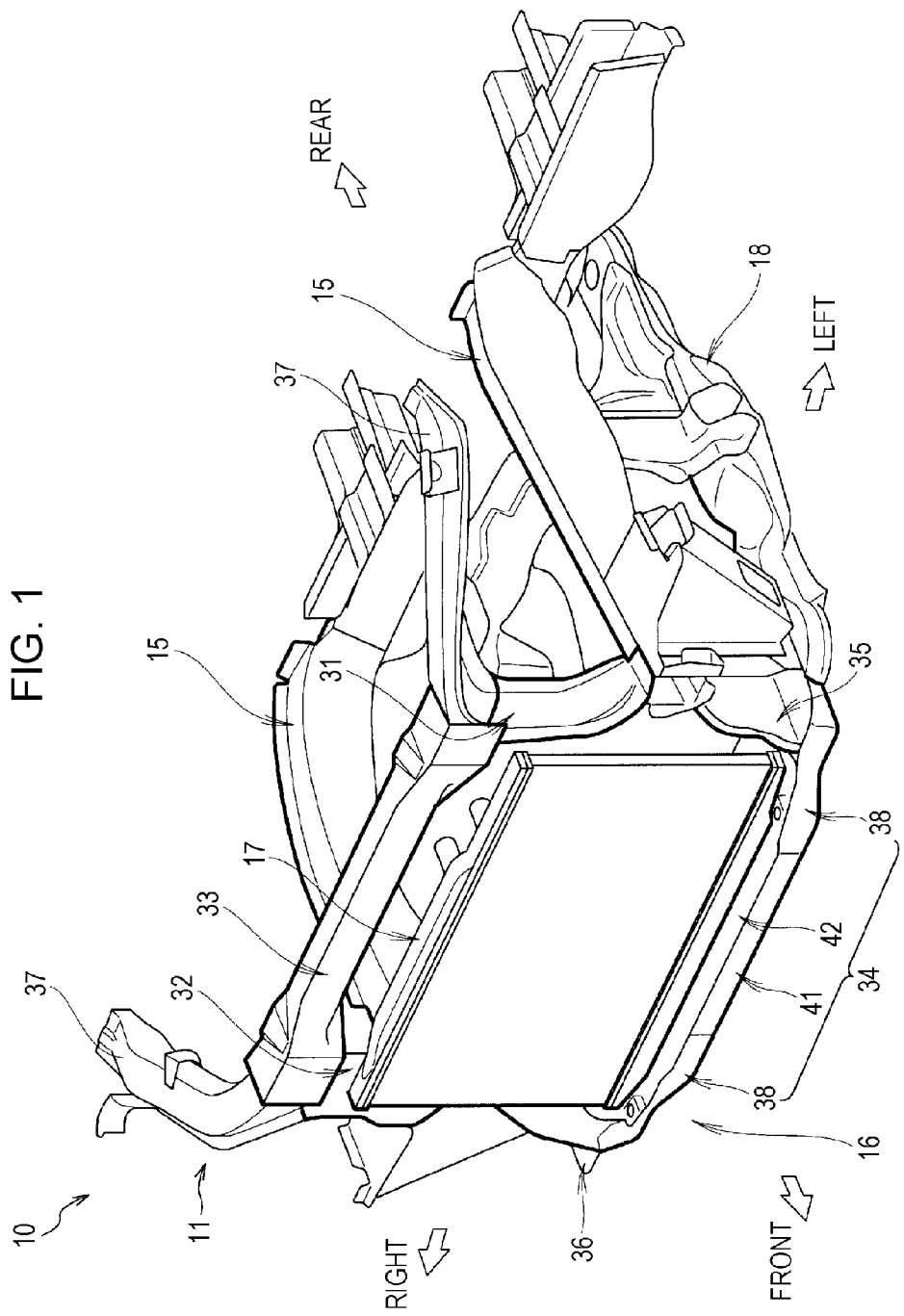
FIG. 1 is a perspective view showing a vehicle-body front structure according to an embodiment.
Figure 2:
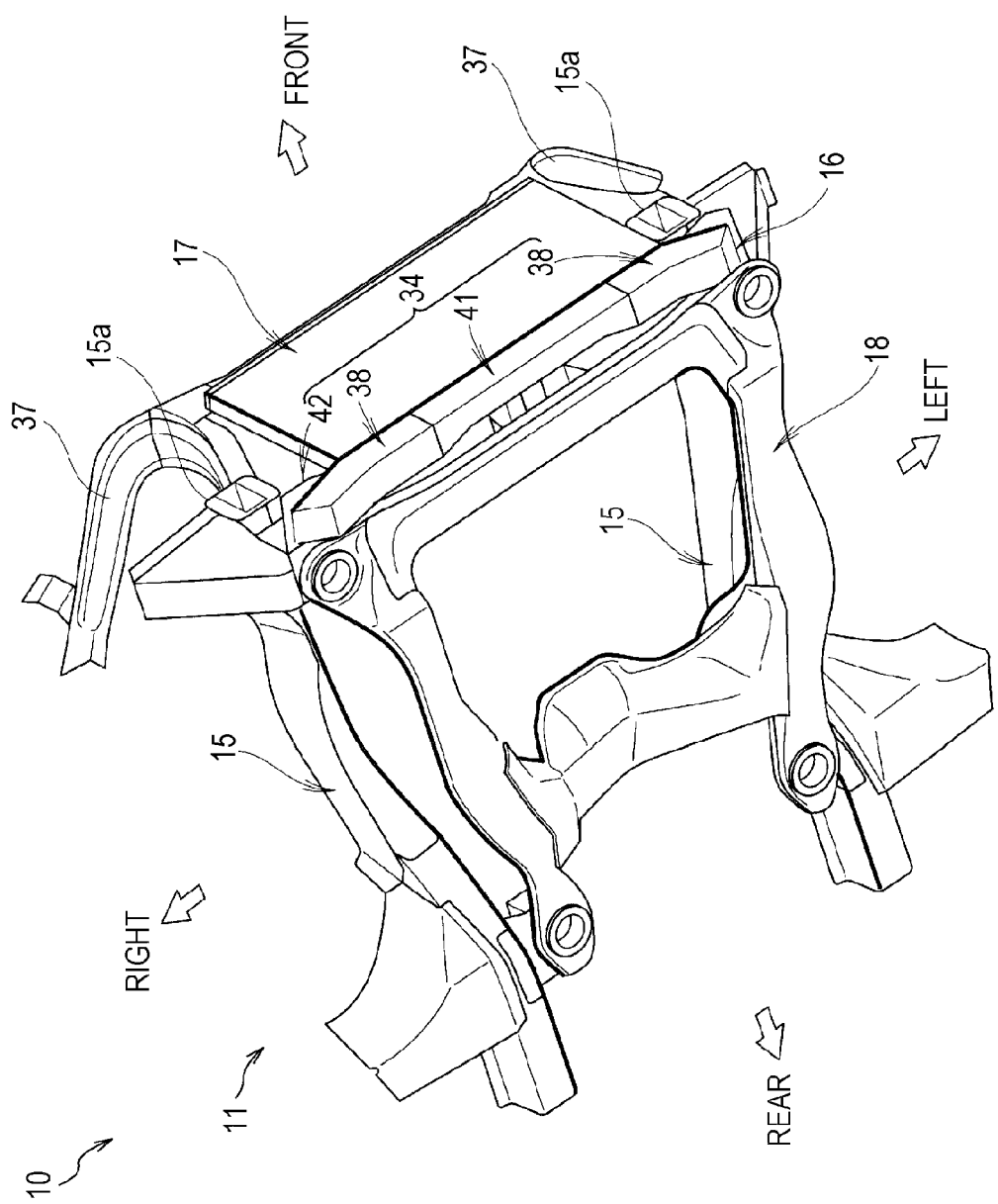
FIG. 2 is a perspective view of the vehicle-body front structure shown in FIG. 1 when viewed from a lower side.
Figure 3:
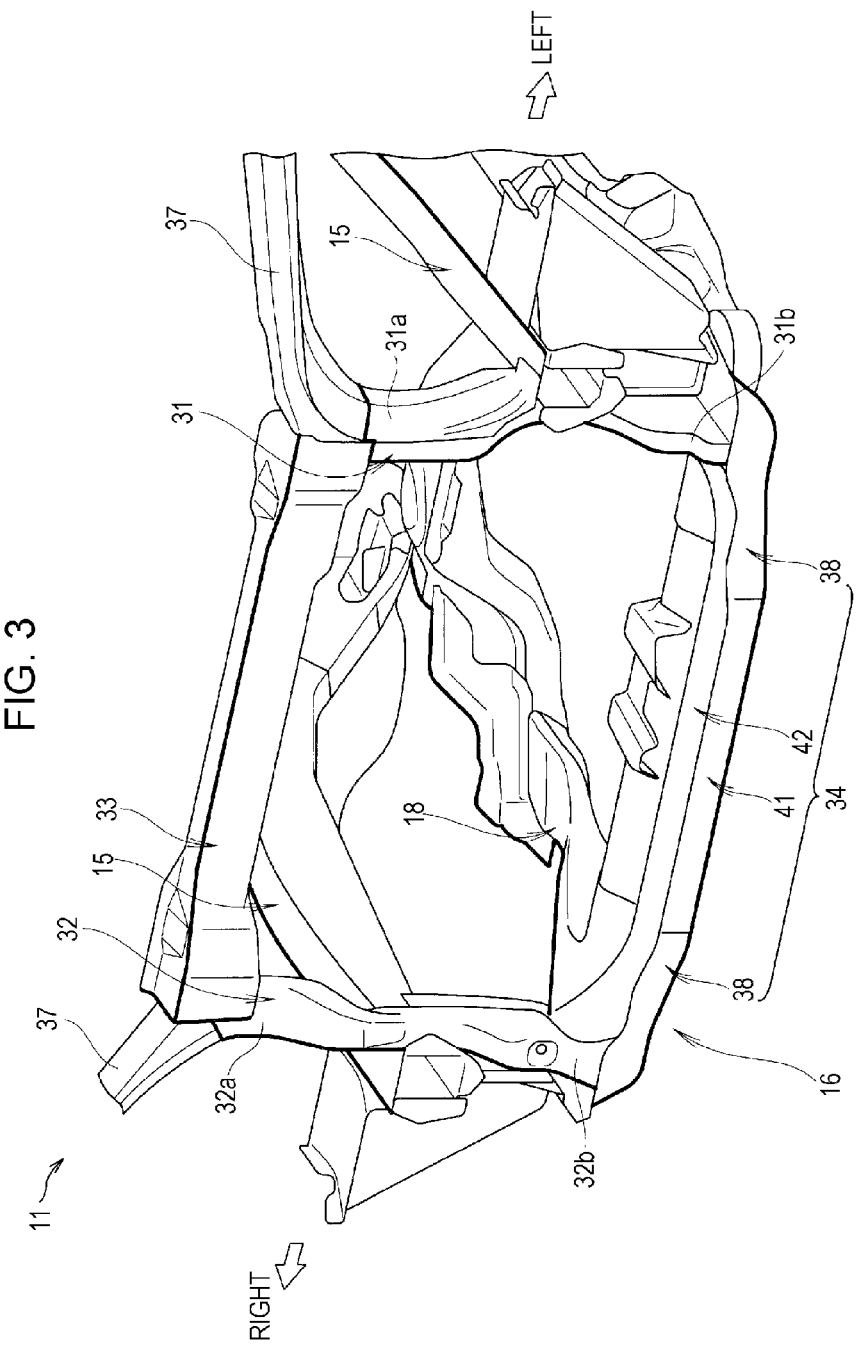
FIG. 3 is a perspective view when a radiator of the vehicle-body front structure shown in FIG. 1 is removed.
Figure 4:
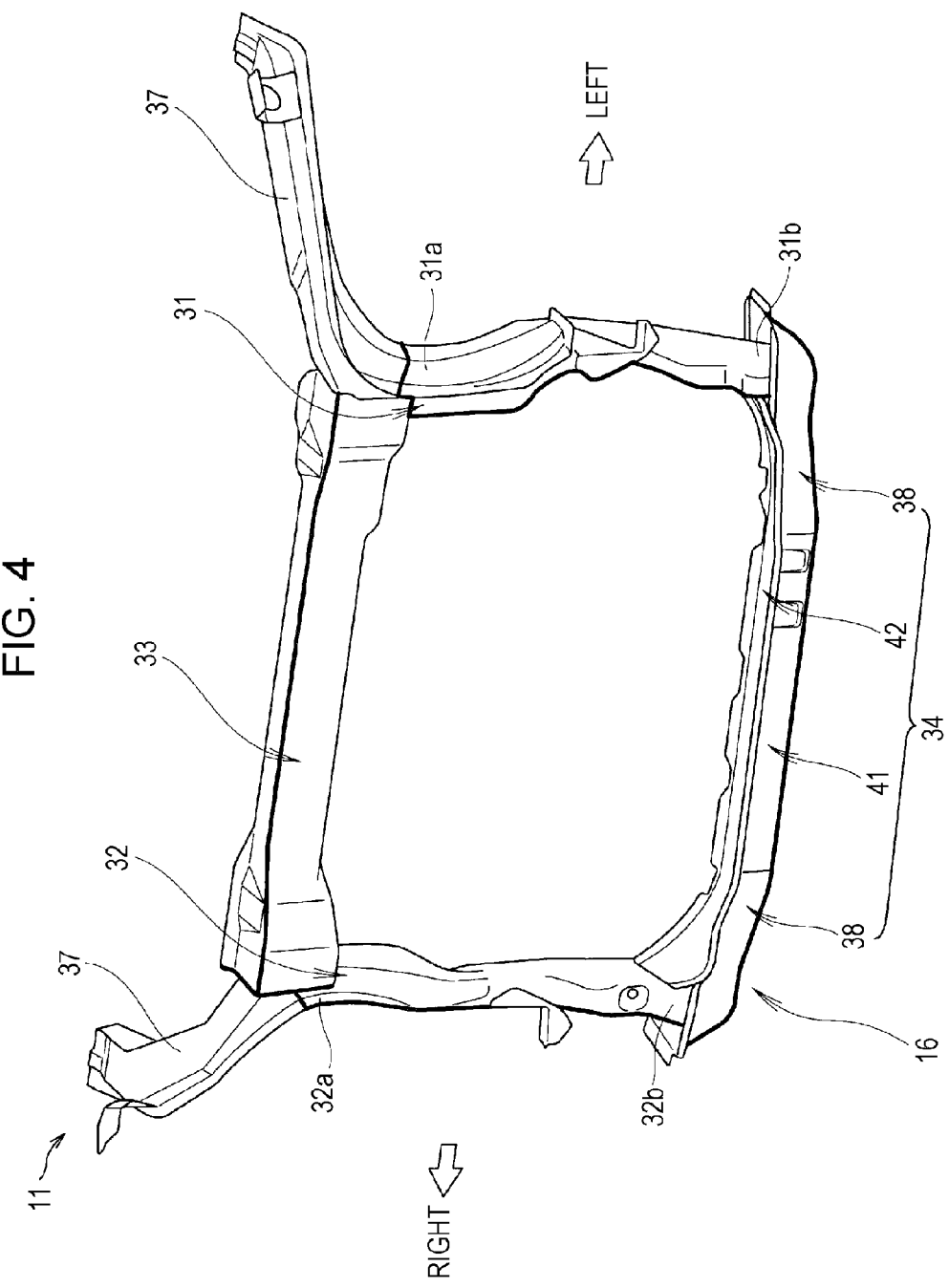
FIG. 4 is a perspective view of a bulkhead of the vehicle-body front structure shown in FIG. 1.

An embodiment is described below with reference to the accompanying drawings. It is to be noted that the drawings are viewed along directions indicated by reference signs.

Embodiment

As shown in FIGS. 1, and 5 to 8, a vehicle-body front structure according to an embodiment has a structure in which a bulkhead lower member 34 has a smaller length than a distance between left and right bulkhead side members 31, 32; extensions 38, 38 respectively extend from both ends 34a, 34a of the bulkhead lower member 34; portions extending from both the ends 34a, 34a (one of them is not shown) of the bulkhead lower member 34 to radiator mount support bracket portions are integrally formed with the bulkhead lower member 34; three members of a body portion 41 of the bulkhead lower member 34, a lid 42 of the bulkhead lower member 34, and the extensions 38 are fixed by spot welding; and radiator support portions 49 corresponding to the radiator mount support bracket portions are joined to front walls 72 and rear walls 73 of the extensions 38. Thus, the vehicle-body front structure provides a rigidity satisfying operation stability and noise vibration (NV) performance.

Hereinafter, the vehicle-body front structure according to the embodiment is described below in detail with reference to FIGS. 1 to 17.

As shown in FIGS. 1 to 4, a vehicle 10 is a passenger car, and includes, at a front part of a vehicle body 11, left and right front side frames 15, 15 extending in the vehicle front-rear direction, a rectangular bulkhead 16 provided at front ends 15a, 15a of the left and right front side frames 15, 15, a radiator 17 supported by the bulkhead 16, and a sub-frame 18 supported by the left and right front side frames 15, 15.

Figure 11:
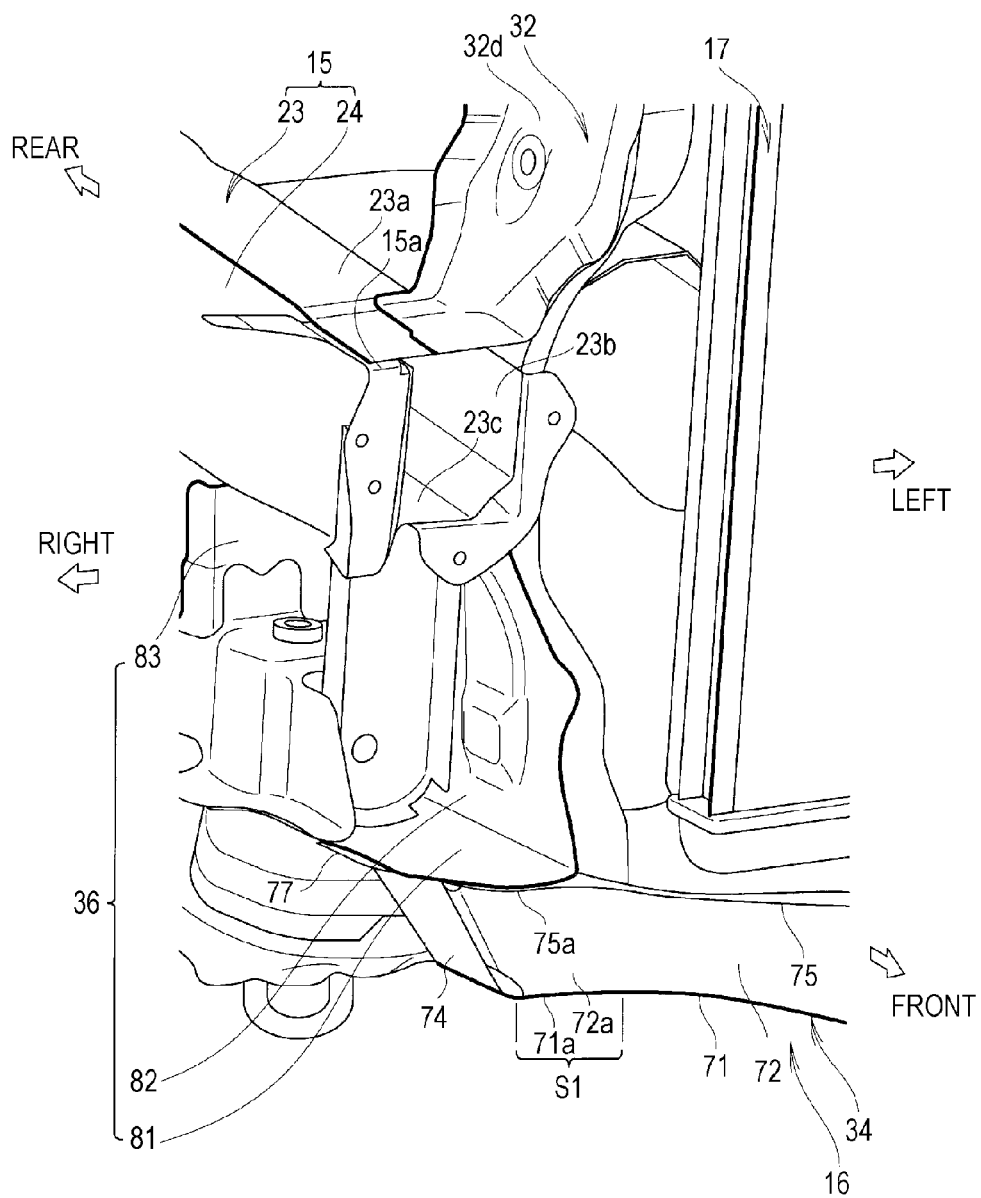
FIG. 11 is a perspective view showing the periphery of a right bulkhead side member of the vehicle-body front structure shown in FIG. 1.

As shown in FIG. 11, each of the front side frames 15 includes a frame body 23 formed in a substantially angular C shape, and a frame lid 24 that covers the frame body 23 from the outer side in the vehicle width direction.

The frame body 23 includes an upper surface 23a facing the vehicle upper side, an inner surface 23b facing the inner side in the vehicle width direction, and a lower surface 23c facing the vehicle lower side. The frame lid 24 corresponds to an outer surface facing the outer side in the vehicle width direction.

The sub-frame 18 is a substantially rectangular member that supports an engine (not shown) etc.

As shown in FIGS. 1 to 5, the radiator 17 is provided in the front part of the vehicle body 11 and is supported by the bulkhead 16.

The radiator 17 includes a radiator upper attachment portion (not shown) attached to a bulkhead upper member 33 of the bulkhead 16, and radiator lower attachment portions (radiator attachment portions) 26, 26 (see FIG. 9, one of them is not shown) attached to the bulkhead lower member 34 of the bulkhead 16.

The bulkhead 16 includes the left and right (a pair of) bulkhead side members 31, 32 extending in the vehicle up-down direction at both sides of the bulkhead 16; the bulkhead upper member 33 extending in the vehicle width direction at upper ends 31a, 32a of the bulkhead side members 31, 32; the bulkhead lower member 34 extending in the vehicle width direction at lower ends 31b, 32b of the bulkhead side members 31, 32; and left and right stiffeners 35, 36 joined to the outer sides in the vehicle width direction of the bulkhead side members 31, 32.

The left bulkhead side member 31 is a member substantially symmetric to the right bulkhead side member 32 about the vehicle body center. The left stiffener 35 is a member substantially symmetric to the right stiffener 36 about the vehicle body center.

The stiffeners 35, 36 are also joined to the bulkhead lower member 34 and the front side frames 15, 15 (also see FIG. 11).

Coupling arms 37, 37 extend from left and right sides of the bulkhead upper member 33 and are supported at an upper member (not shown).

As shown in FIGS. 1 to 10, the bulkhead lower member 34 (more specifically, the body portion 41) has a smaller length than a distance between the pair of bulkhead side members 31, 32. The bulkhead lower member 34 includes the pair of extensions 38, 38 that are respectively hung between the bulkhead lower member 34 and the bulkhead side member 31 and between the bulkhead lower member 34 and the bulkhead side member 32 in the vehicle width direction.

The bulkhead lower member 34 supports the radiator 17 at both the ends 34a, 34a of the bulkhead lower member 34, and is joined to the inner sides of the pair of extensions 38, 38 such that the extensions 38, 38 are hung in the vehicle front-rear direction.

This hung structure may be realized by a structure that the radiator support portions 49 integrally extending from the body portion 41 of the bulkhead lower member 34 (described later) are joined to the inner sides of the extensions 38, 38 (the inner sides of the front walls 72, 72 and the rear walls 73, 73) (see FIGS. 7 and 8).

Figure 6:
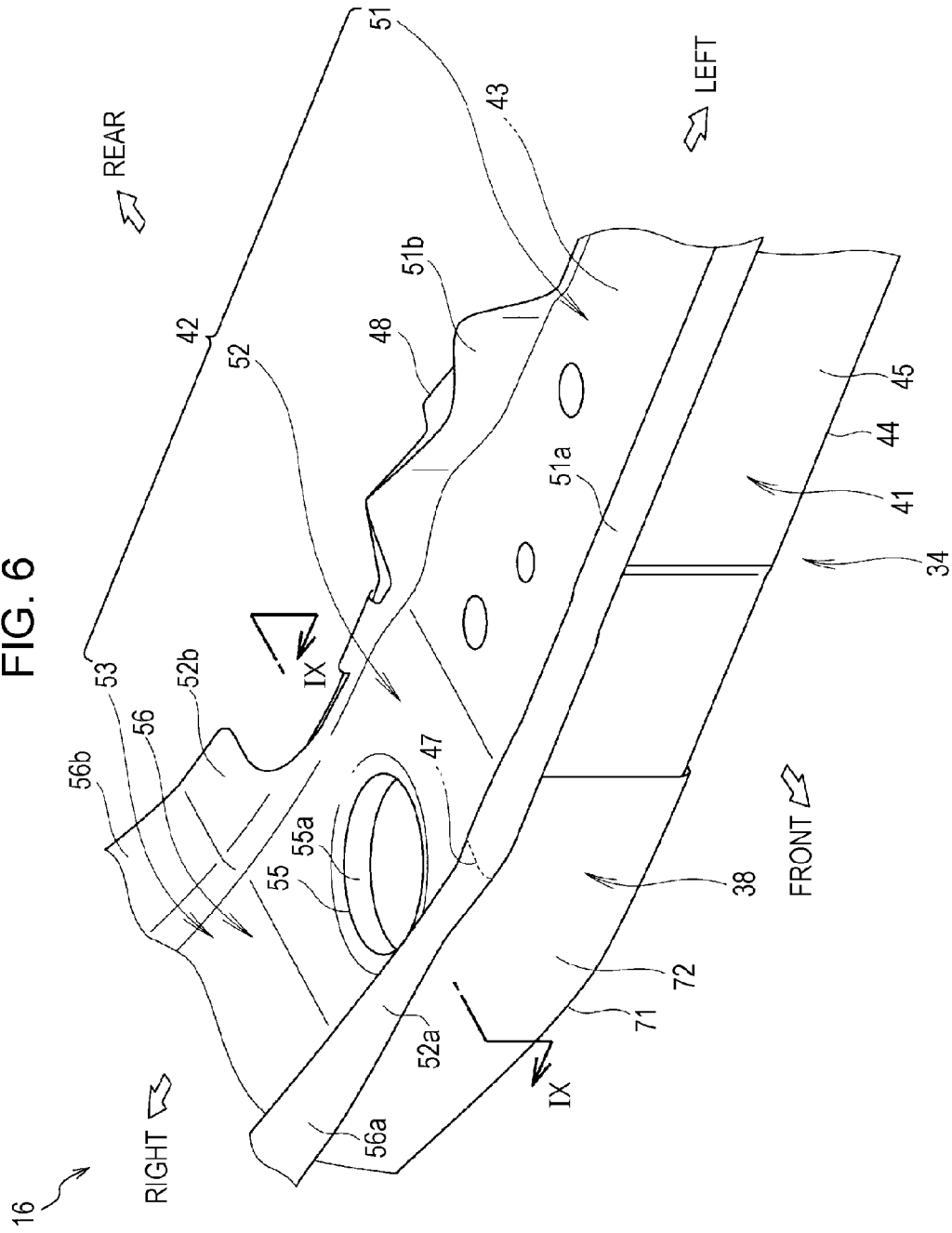
FIG. 6 is a perspective view of an extension joint portion of the vehicle-body front structure shown in FIG. 1.
Figure 8:
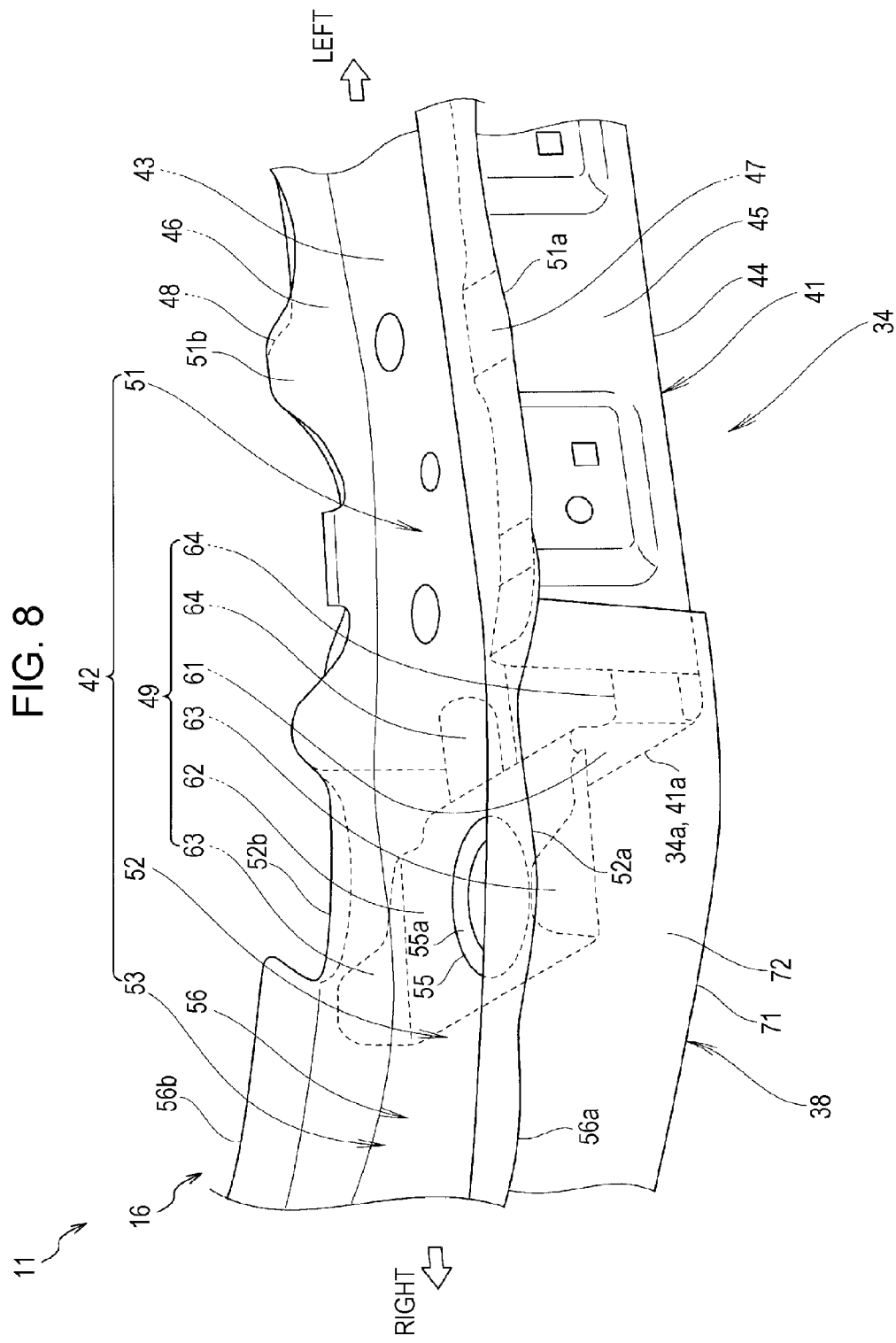
FIG. 8 is a perspective view of a radiator support portion of the vehicle-body front structure shown in FIG. 1.
Figure 9:
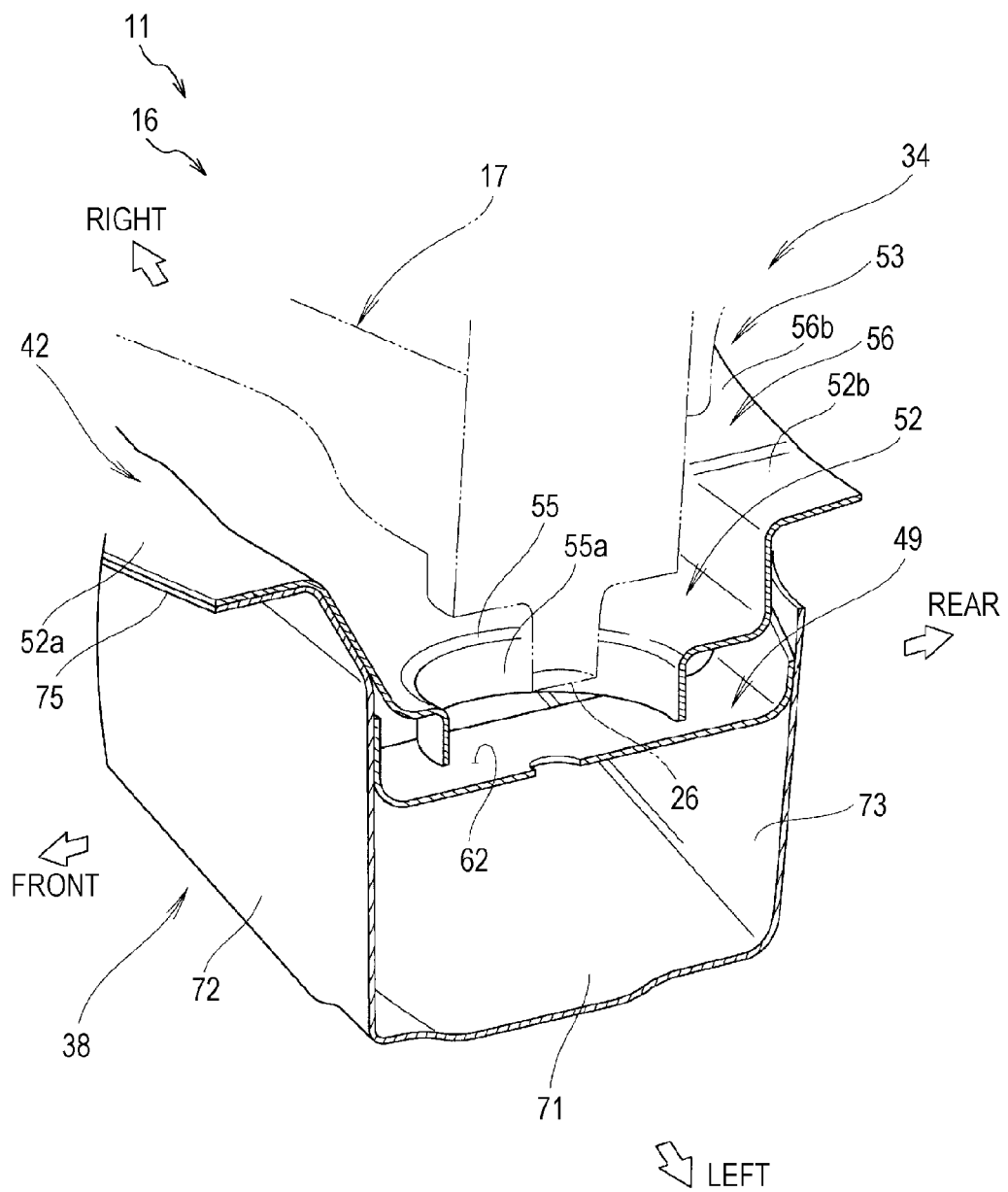
FIG. 9 is a cross-sectional view taken along line IX-IX in FIG. 6.
Figure 10:
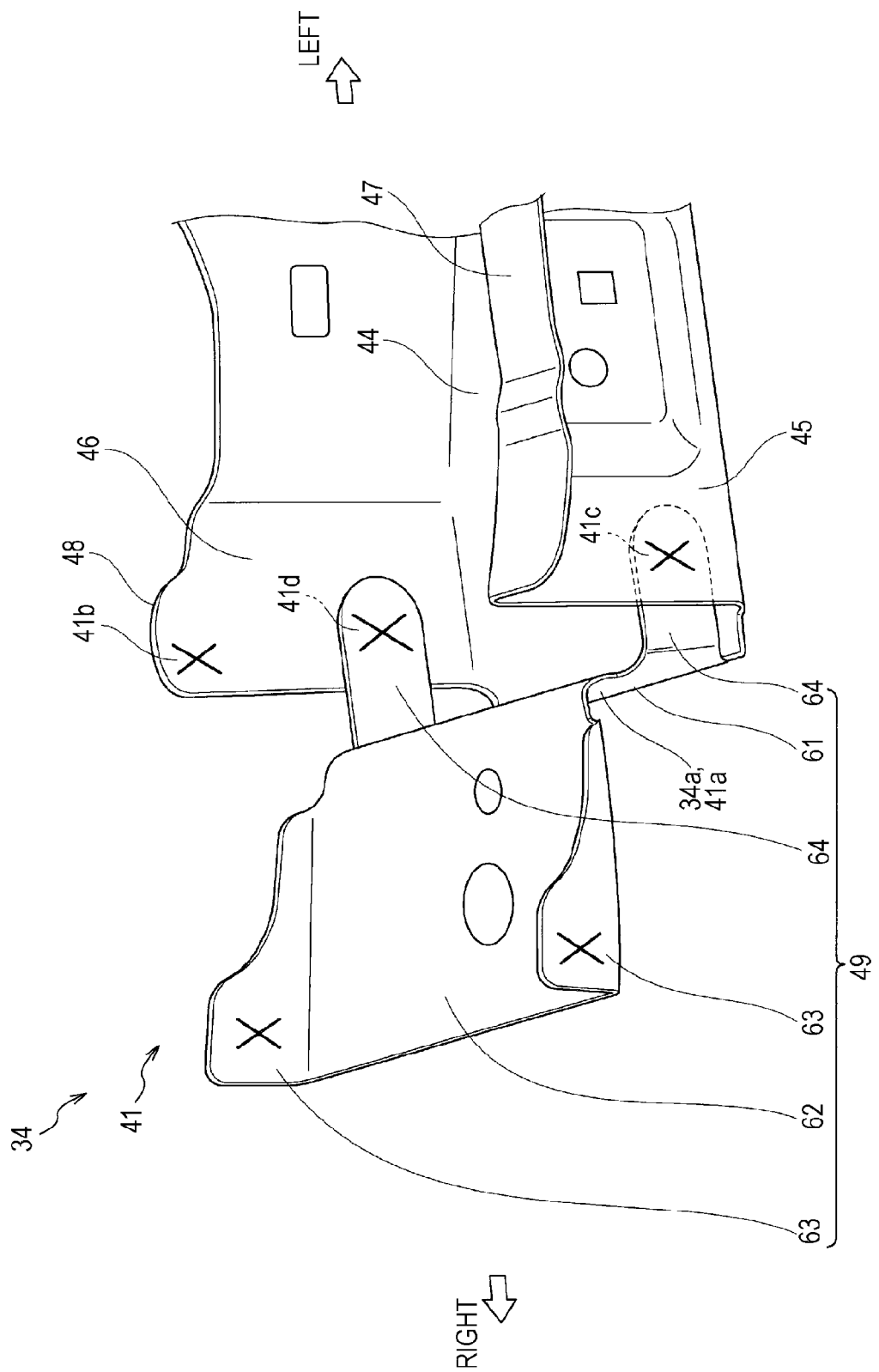
FIG. 10 is a perspective view of a body portion of the vehicle-body front structure shown in FIG. 1.

The bulkhead lower member 34 forms a closed section 43 by the body portion 41 having a U shape in sectional view, and the lid 42 that closes the body portion 41 from the upper side (see FIGS. 6 and 8).

The bulkhead lower member 34 has a smaller length than a distance between the bulkhead side members 31, 32, and the extensions 38, 38 are respectively hung between both the ends 34a, 34a of the bulkhead lower member 34 and portions near the lower ends 31b, 32b of the bulkhead side members 31, 32 (see FIGS. 6 and 8).

The extensions 38, 38 and the bulkhead lower member 34 are arranged to be substantially horizontal to each other in front view (elevation view) (see FIG. 6).

The bulkhead lower member 34 has the radiator support portions 49, 49 (one of them is not shown) that extend from both the ends 34a, 34a to the outer sides in the vehicle width direction, and support the radiator 17. To be more specific, the radiator support portions 49 that extend from outer ends 41a, 41a of the body portion 41 being a component of the bulkhead lower member 34 to the outer sides in the vehicle width direction, and that support the radiator 17 are formed. That is, both the ends 34a, 34a of the bulkhead lower member 34 are located at the same positions as the outer ends 41a, 41a of the body portion 41 (FIG. 8).

Figure 7:
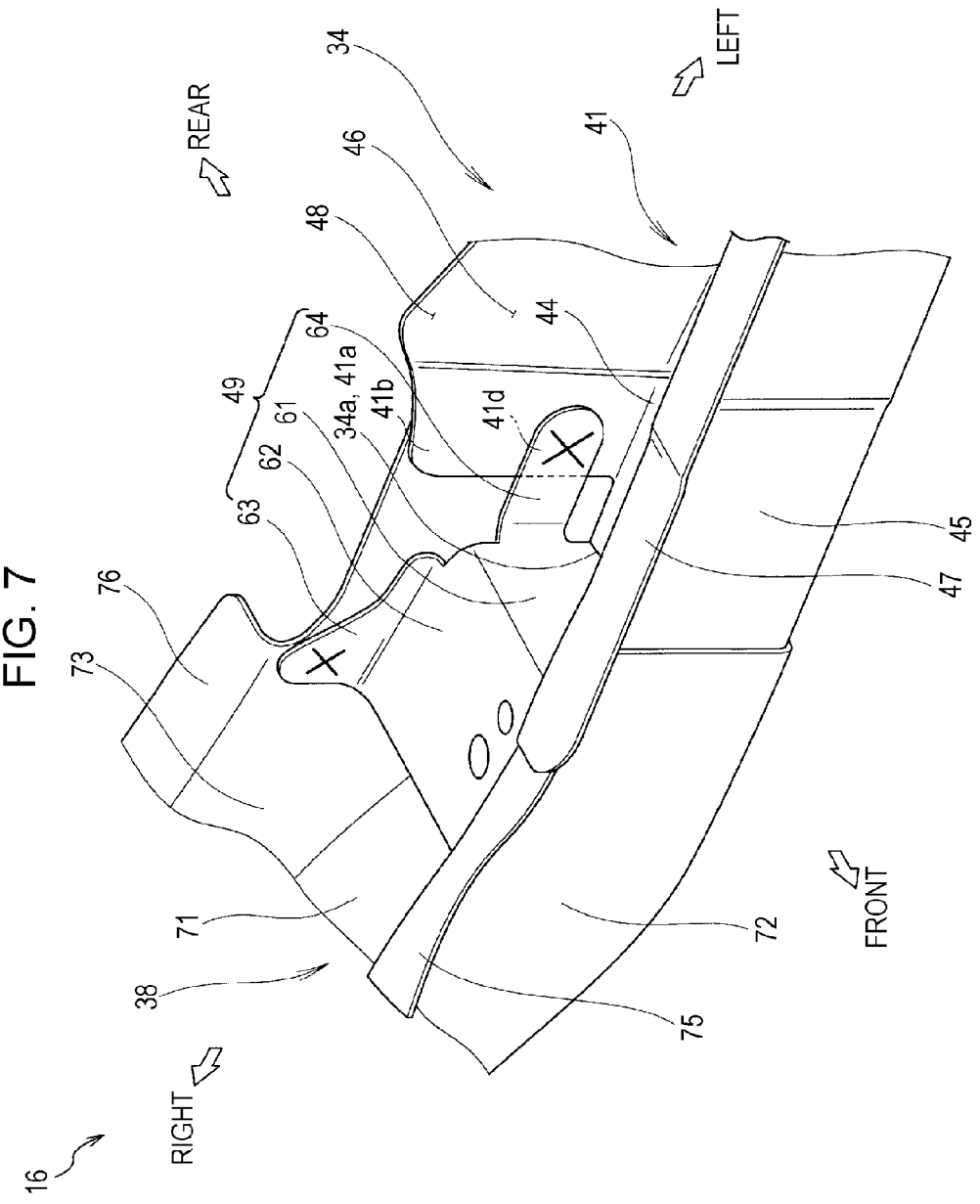
FIG. 7 is a perspective view when a lid of the extension joint portion of the vehicle-body front structure shown in FIG. 1 is removed.

The body portion 41 is formed of a bottom wall 44, a front wall 45, a rear wall 46, a front flange 47 extending from the front wall 45 to the vehicle front side, a rear flange 48 extending from the rear wall 46 to the vehicle rear side, and the left and right radiator support portions 49, 49 integrally formed with the bottom wall 44 (see FIG. 7).

Figure 5:
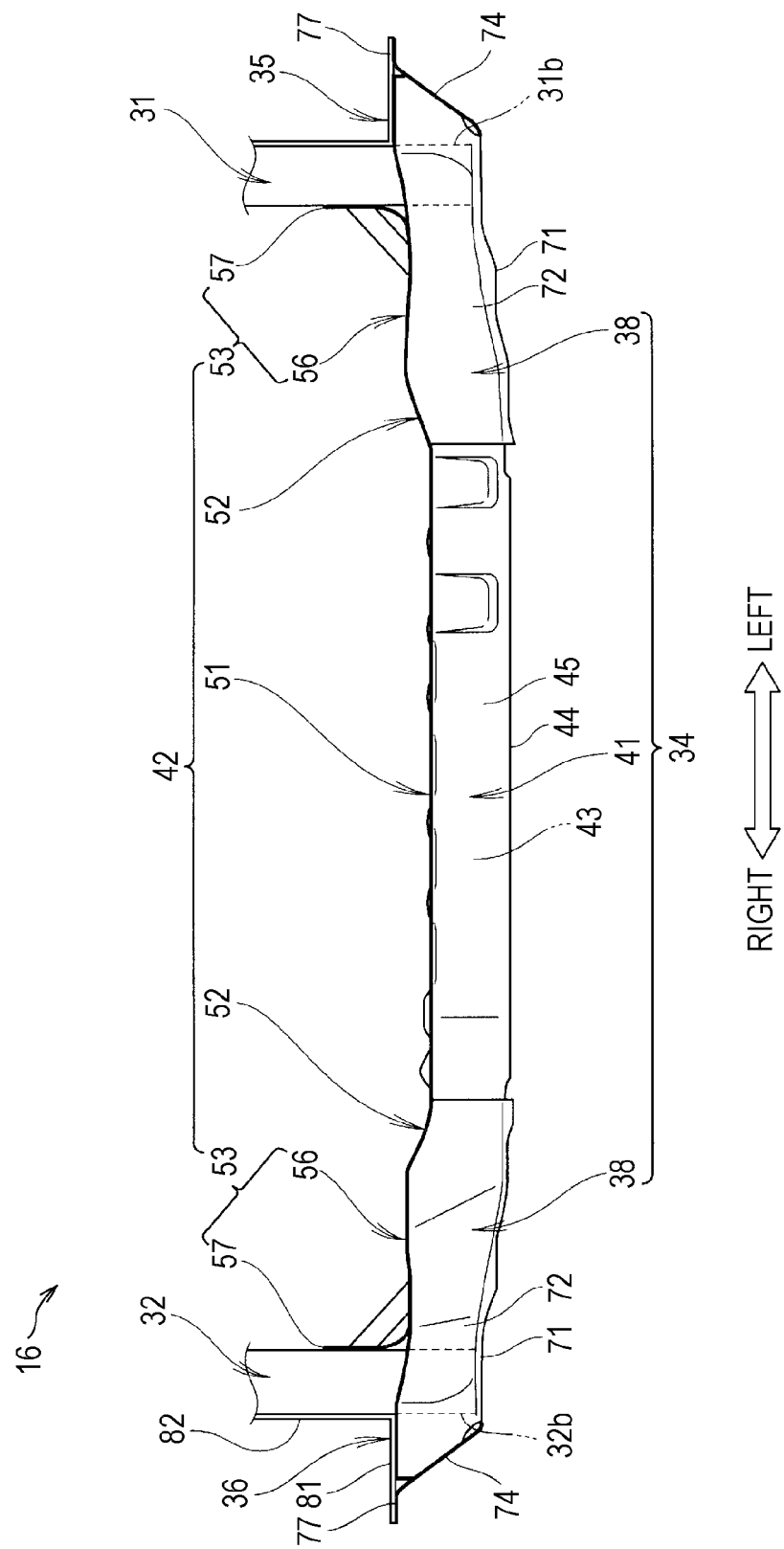
FIG. 5 is an elevation view of a bulkhead lower member of the vehicle-body front structure shown in FIG. 1.

As shown in FIG. 5, the lid 42 extends to the bulkhead side members 31, 32, and covers the left and right extensions 38, 38 and the body portion 41.

That is, the lid 42 is integrally formed with a body lid 51 that covers the body portion 41, radiator support lids 52, 52 that cover the radiator support portions 49, 49, and extension lids 53, 53 that cover the extensions 38, 38.

As shown in FIG. 6, the body lid 51 includes a lid front flange 51a that is joined to the front flange 47 of the body portion 41, and a lid rear flange 51b that is joined to the rear flange 48 of the body portion 41. The lid front flange 51a is a horizontal flange. The lid rear flange 51b is a vertical flange.

The radiator support lid 52 near the bulkhead side member 32 is described. The radiator support lid 52 near the bulkhead side member 31 is formed to be substantially symmetric to the radiator support lid 52 near the bulkhead side member 32 about the vehicle body center.

The radiator support lid 52 has a support front flange 52a that is joined to a front joint flange 75 of the extension 38, a support rear flange 52b that is joined to a rear joint flange 76 of the extension 38, and an opening 55 that receives and causes a radiator lower attachment portion 26 of the radiator 17 to face the radiator support portion 49 (see FIG. 6).

The support front flange 52a and the support rear flange 52b are horizontal flanges. The opening 55 is provided with a circular flange 55a and hence is reinforced (see FIG. 8).

The extension lid 53 near the bulkhead side member 32 is described. The extension lid 53 near the bulkhead side member 31 is formed to be substantially symmetric to the extension lid 53 near the bulkhead side member 32 about the vehicle body center.

As shown in FIGS. 11 to 15, the extension lid 53 includes an extension joint portion 56 that covers the extension 38, and a side joint portion 57 that is joined to the bulkhead side member 32.

The extension joint portion 56 includes an extension front flange 56a that is joined to the front joint flange 75 of the extension 38, and an extension rear flange 56b that is joined to the rear joint flange 76 of the extension 38.

The lid front flange 51a, the support front flange 52a, and the extension front flange 56a are continuously formed. The support rear flange 52b and the extension rear flange 56b are continuously formed.

As shown in FIGS. 6 to 10, each of the radiator support portions 49 is formed of a vertical wall 61 that extends and rises from the bottom wall 44 of the body portion 41 by bending the bottom wall upward, a lateral wall 62 that extends from the vertical wall 61 to the outer side in the vehicle width direction, front and rear vertical wall flanges 64, 64 formed at the vertical wall 61, and front and rear lateral wall flanges 63, 63 formed at the lateral wall 62.

The radiator support portion 49 is joined to both the body portion 41 and the extension 38.

That is, the radiator support portion 49 is spot-welded to three layers at a portion near each of both the ends 34a, 34a of the bulkhead lower member 34.

More specifically, the lid 42, the body portion 41, and the extension 38 are spot-welded at a rear upper end 41b of the body portion 41. The radiator support portion 49 (front and rear lateral flanges) and the lid 42 are spot-welded at front and rear lower ends 41c, 41d of the body portion 41.

Such configuration can provide rigidity around the radiator support portion 49, and can make a contribution to an increase in operation stability.

Since the radiator support portion 49 is hung between the front wall 72 and the rear wall 73 in the extension 38, an effect like a stiffener can be obtained, and an opening phenomenon of the extension 38 or the body portion 41 can be prevented from occurring and the rigidity for the operation stability can be provided.

Figure 12:
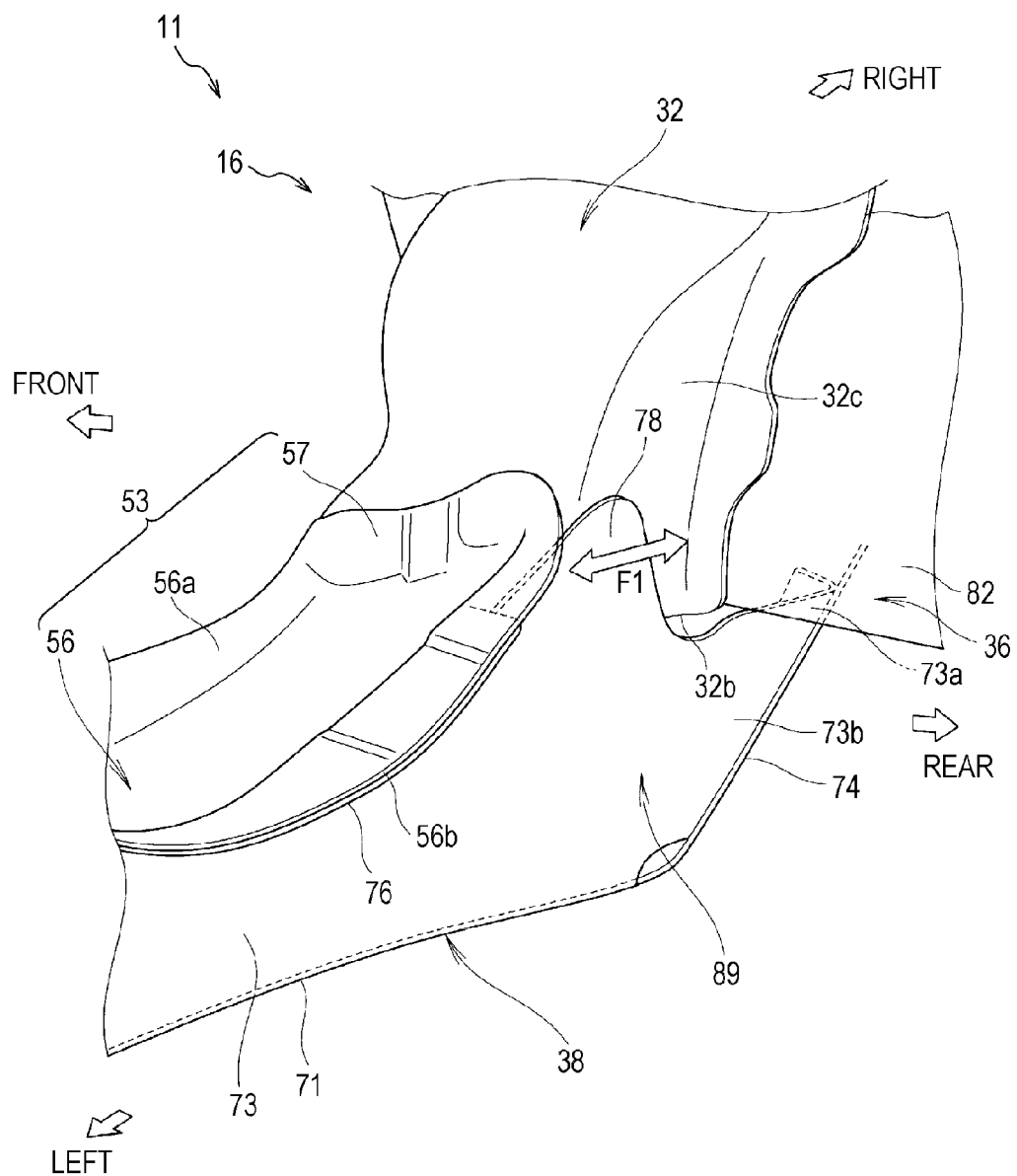
FIG. 12 is a perspective view showing a connection portion between the right bulkhead side member and an extension of the vehicle-body front structure shown in FIG. 1.
Figure 13:
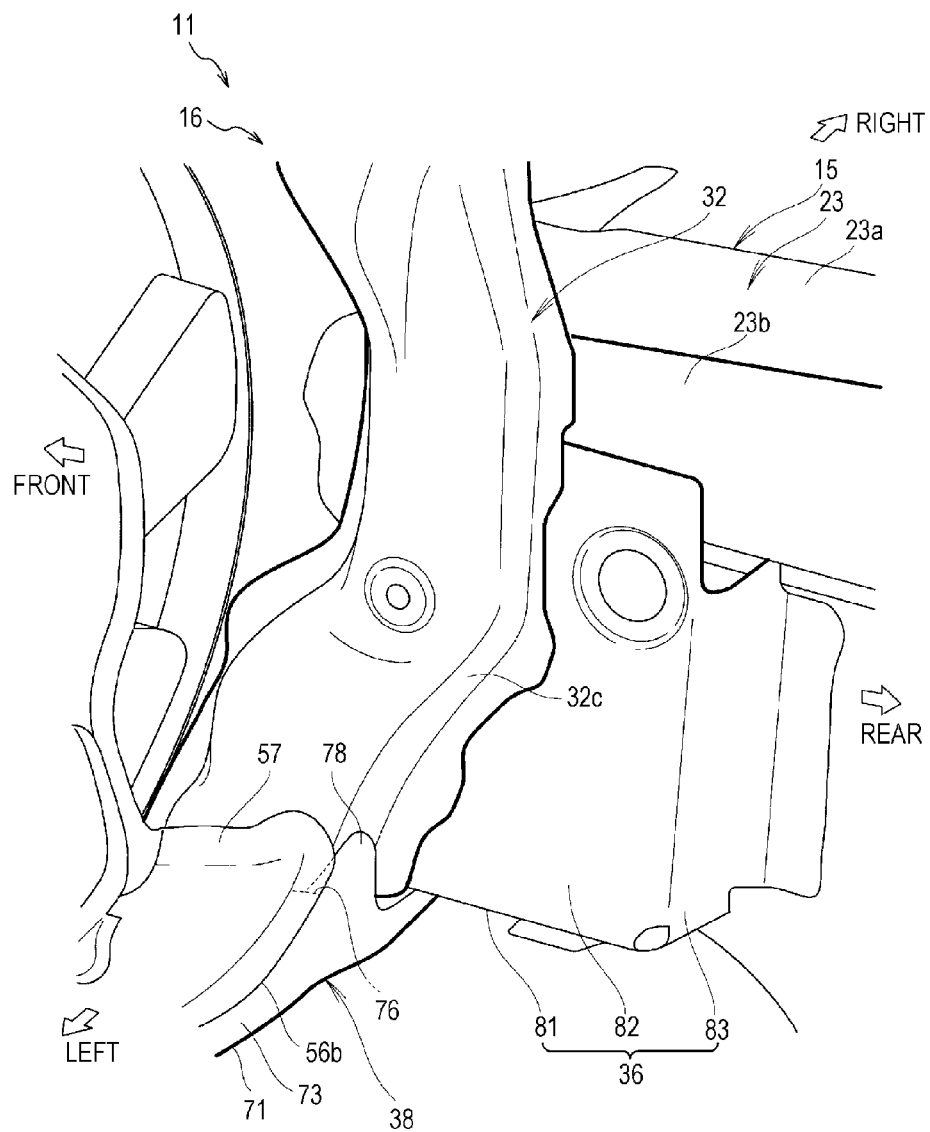
FIG. 13 is a perspective view showing a stiffener of the right bulkhead side member of the vehicle-body front structure shown in FIG. 1 when viewed from the inner side of a vehicle body.

The extension 38 is formed of a bottom surface 71 facing the vehicle lower side, the front wall 72 standing on the bottom surface 71 and facing the vehicle front side, the rear wall 73 vertically arranged on (standing on) the bottom surface 71 and facing the vehicle rear side, an inclined wall 74 standing on the bottom surface 71 to the obliquely outer side in the vehicle width direction, the front joint flange 75 that is bent from the front wall 72 to the vehicle front side, the rear joint flange 76 that is bent from the rear wall 73 to the vehicle rear side, an outer flange 77 that is bent from the inclined wall 74 to the vehicle outer side, and an extending portion 78 that extends from the rear wall 73 to the vehicle upper side (see FIG. 12).

As shown in FIGS. 11 to 15, the extending portion 78 is a substantially triangular portion formed at the outer side in the vehicle width direction of the rear wall 73. The extending portion 78 is joined to a rear surface (the vehicle rear side) 32c of the bulkhead side member 32. That is, the extension 38 has a U shape in sectional view and is joined to cover the outer end 41a of the body portion 41 from the lower side. The extension 38 is arranged at the bulkhead lower member 34 substantially horizontally in front view.

Further, the extension 38 has a stiffener support portion 79 that extends to the outer side in the vehicle width direction with respect to the bulkhead side member 32 and supports the stiffener 36 by an upper surface 79a.

The stiffener support portion 79 is a portion that is formed of an outermost end portion 72a of the front wall 72, an outermost end portion 73a of the rear wall 73, the inclined wall 74, an outermost end portion 75a of the front joint flange 75, and the outer flange 77.

An area S1 on the outer side in the vehicle width direction with respect to the bulkhead side member 32 is defined by an outermost end portion 71a of the bottom surface 71, the outermost end portion 72a of the front wall 72, the outermost end portion 73a of the rear wall 73, and the outermost end portion 75a of the front joint flange 75. That is, the stiffener support portion 79 is the same portion as an outer end portion 38a of the extension 38.

The material of the body portion 41 (see FIG. 10) and the extension 38 of the bulkhead lower member 34 is a normal steel sheet (a material corresponding to JSC270C). The body portion 41 has a sheet thickness of 1.0 t, the lid 42 has a sheet thickness of 0.9 t, and the extension 38 has a sheet thickness of 1.8 t. The extension 38 is a rigid body that prevents deformation.

If the bulkhead lower member 34 is formed as a single unit, the sheet thickness has to be entirely 1.8 t, resulting in an increase in weight. This is not preferable.

For example, if a support for the radiator is formed at the bottom wall of the body portion, a recess (a dent) toward the upper side may be generated depending on the size of the radiator. A section required for the operation stability cannot be provided.

As shown in FIGS. 6 to 10, the body portion 41 and the radiator support portions 49, 49 of the bulkhead lower member 34 are integrally formed by press-forming. The radiator support portions 49, 49 extend from the outer ends 41a, 41a of the body portion 41. Hence, an additional member does not have to be provided when the radiator support portions 49, 49 are provided. Also, adjustment in the height direction can be easily performed depending on the size of the radiator 17.

The length in the vehicle width direction of the bulkhead lower member 34 is inevitably determined based on the following factors: the positions of the radiator lower attachment portions (radiator lower end fixing portions) 26, 26, the shapes of the radiator lower end fixing portions, the position in the height direction depending on the size of the radiator, an insertion hole and a bending margin etc. required for the structure of a molding die to form the joint flanges (the vertical wall flanges) 64, 64 of the front and rear lower ends 41c, 41d of the bulkhead lower member 34 (the body portion 41).

As shown in FIGS. 11 to 15, the stiffener 36 is a member that is arranged around the bulkhead side member 32, the bulkhead lower member 34, and the front side frame 15. The stiffener 36 includes a bottom surface 81 that is joined to the upper surface 79a of the stiffener support portion 79, a side surface 82 that is joined to an outer surface (the outer side in the vehicle width direction) 32d of the bulkhead side member 32, and a rear surface 83 that is bent from the side surface 82.

The side surface 82 is joined to the inner surface 23b of the front side frame 15 and to the bulkhead side member 32. The bottom surface 81 is joined to the stiffener support portion 79.

Also, the stiffener 36 is a member that is formed in an L shape at the upper surface 79a of the stiffener support portion 79 and at the outer side in the vehicle width direction of the bulkhead side member 32.

The bulkhead side member 32 is fixed to the inner surface 23b of the front side frame 15 and the stiffener 36. Thus, the portion near the outer end portion 38a of the extension 38 is further reinforced, and can provide the rigidity for the operation stability. It is to be noted that the outer end portion 38a of the extension 38 is the same portion as the stiffener support portion 79 (described later).

Since the side surface 82 of the stiffener 36 and the side joint portion 57 of the lid 42 form a structure that pinches the bulkhead side member 32, the structure resists against an input of a load in the left-right direction, and the structure can provide the rigidity for the operation stability.

The outer end portion 38a of the extension 38 includes a cover portion 89 that covers the lower end 32b of the bulkhead side member 32.

The cover portion 89 is formed of an outer end portion 71b of the bottom surface 71, an outer end portion 72b of the front wall 72, and an outer end portion 73b of the rear wall 73. The cover portion 89 is joined to the bulkhead side member 32 at the outer end portion 72b of the front wall 72 and at the outer end portion 73b of the rear wall 73. The extending portion 78 is provided at the upper side of the outer end portion 73b of the rear wall 73.

Since the extension 38 has the extending portion 78 at the position corresponding to the rear portion of the bulkhead side member 32 and is joined to the rear surface (the vehicle rear side) 32c of the bulkhead side member 32, an additional reinforcing member, which is typically obliquely hung between the bulkhead side member and the bulkhead lower member, is not required, and an effect of a proper increase in rigidity can be obtained.

The extending portion 78 is spot-welded to the bulkhead side member 32 in the vehicle front-rear direction. That is, a separating direction of the extending portion 78 by a load indicated by arrow F1 in FIG. 12 is a shear stress direction. Thus, the bonding strength is high and the extending portion 78 is hardly separated.

Figure 16A:
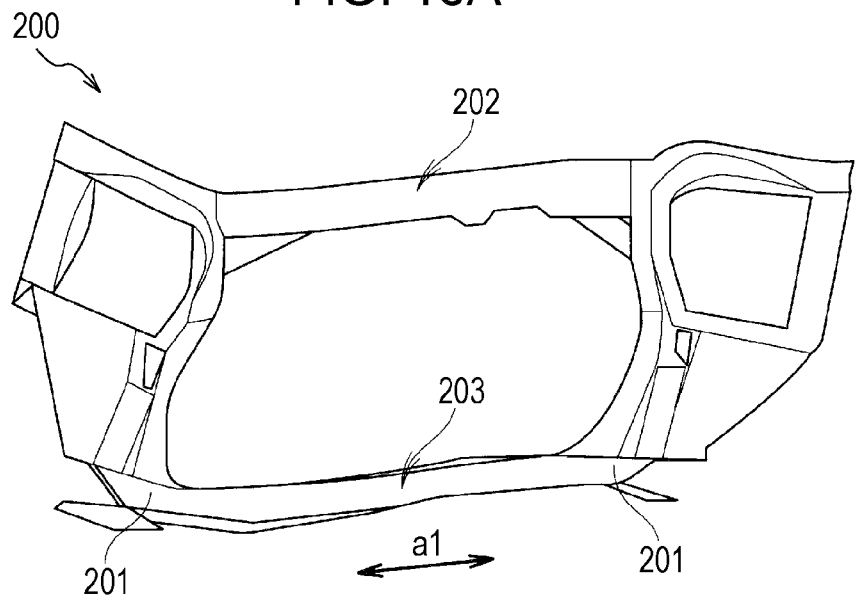
FIGS. 16A and 16B are explanatory views showing a behavior caused by a drive load of a typical bulkhead.
Figure 16B:
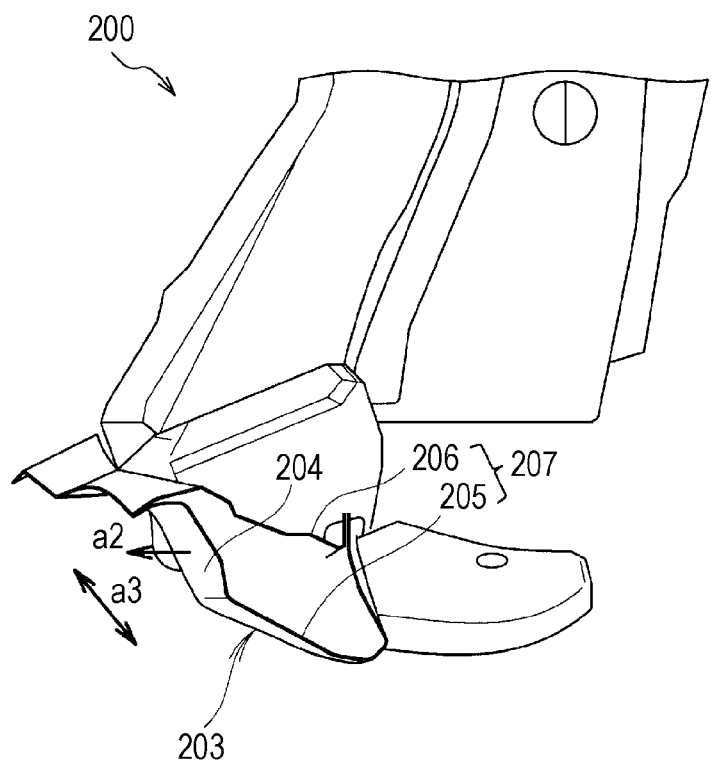

FIGS. 16A and 16B illustrate a behavior by a drive load of a typical bulkhead 200 during driving.

In FIG. 16A, while various drive loads act during driving, in particular, a load in the left-right direction indicated by arrow a1 is input to lower end portions 201, 201, of the bulkhead. Moments in opposite phases are generated at a bulkhead lower member 203 and a bulkhead upper 202 of the bulkhead 200.

To avoid an effect on the operation stability, the bulkhead lower member 203 has to have a proper sectional area. Also, the vibration has to be reduced such that, by providing the proper rigidity, the frequency specific to the vehicle body is changed, and resonance with the oscillation of the engine is avoided.

In FIG. 16B, when a load in the left-right direction is input to the bulkhead lower member 203, a front wall 204 of the bulkhead lower member 203 is pushed to the front side as indicated by arrow a2, a reciprocating moment from the obliquely upper front side to the obliquely lower rear side as indicated by arrow a3 acts on the entire bulkhead 200, and a phenomenon in which a closed section 207 formed by a hat section 205 and its upper lid 206 is deformed (called opening phenomenon) occurs.

That is, as shown in FIG. 16A, in the bulkhead 200, the upper and lower portions are displaced in opposite left and right directions because of the load during driving. Owing to this, a burden on the lower end portions 201, 201 of the bulkhead is high. Similarly, in the bulkhead 16 according to the embodiment shown in FIG. 4, large loads act on joint portions between the outer end portions 38a, 38a of the extensions 38, 38 and the lower ends 31b, 32b of the bulkhead side members 31, 32. Thus, a burden is high. Owing to this, a countermeasure is taken with the structure that pinches the bulkhead side member 32 by the side surface 82 of the stiffener 36 and the side joint portion 57 of the lid 42 (see FIG. 15).

Figure 15:
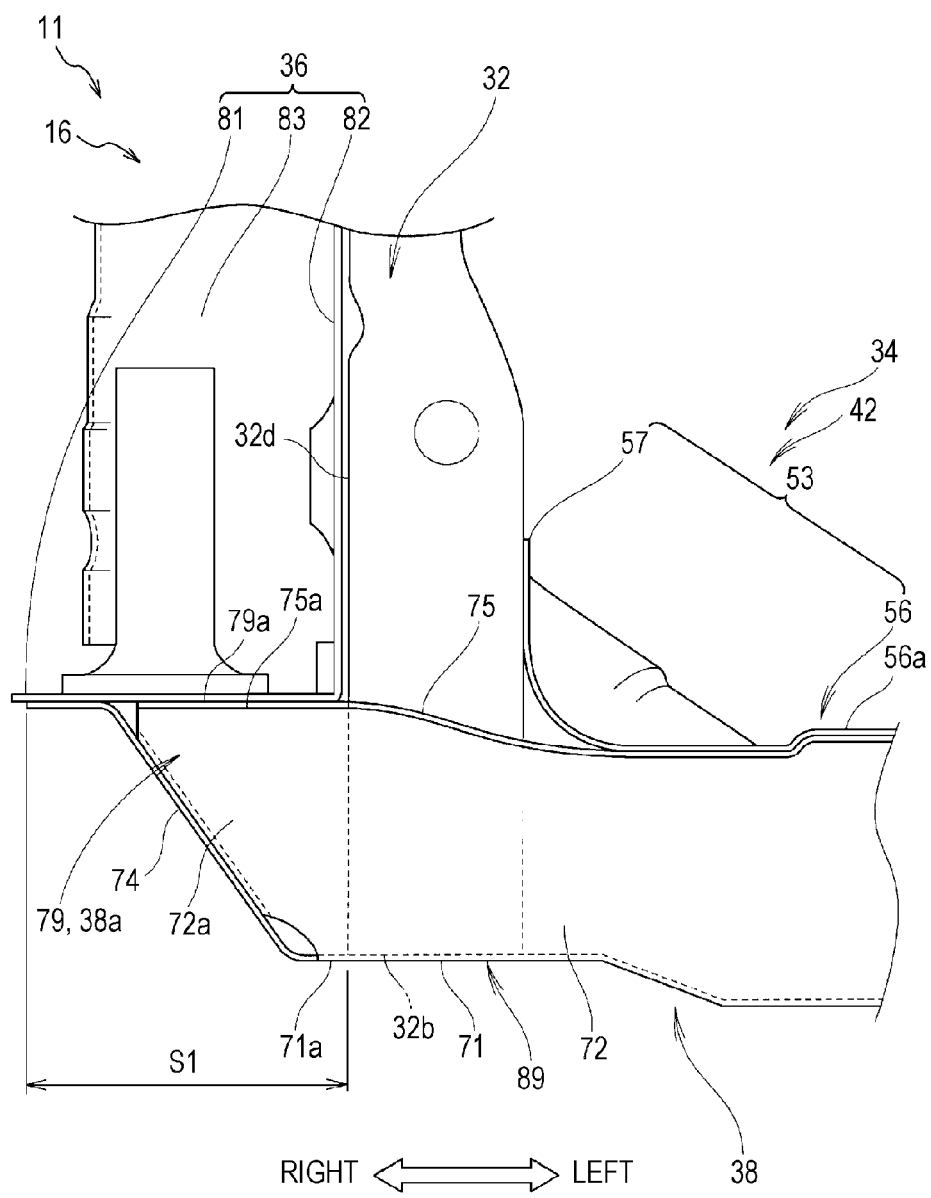
FIG. 15 is an elevation view showing the stiffener of the right bulkhead side member of the vehicle-body front structure shown in FIG. 1 when viewed from the front side of the vehicle body.

As described above, with the vehicle-body front structure, as shown in FIGS. 1 and 15, the specific vibration frequency of the front part of the vehicle body 11 is changed by increasing the rigidity of the entire bulkhead 16. Accordingly, the resonance with the engine oscillation frequency can be avoided. Thus, the vibration of the vehicle body 11 can be restricted.

As shown in FIGS. 1 to 5, the vehicle-body front structure includes the rectangular bulkhead 16 that supports the radiator 17 provided in the front part of the vehicle body 11.

The bulkhead 16 includes the pair of bulkhead side members 31, 32 at both sides of the bulkhead 16 and extending in the vehicle up-down direction, and the bulkhead lower member 34 arranged at the lower ends 31b, 32b of the bulkhead side members 31, 32 and extending in the vehicle width direction. The bulkhead lower member 34 has the smaller length than the distance between the pair of bulkhead side members 31, 32. The bulkhead lower member includes pair of extensions 38, 38 being respectively hung between the bulkhead lower member 34 and the bulkhead side member 31 and between the bulkhead lower member 34 and the bulkhead side member 32. The bulkhead lower member 34 supports the radiator 17 at both the ends 34a, 34a of the bulkhead lower member 34. The bulkhead lower member 34 is joined to the inner sides of the pair of extensions 38, 38 such that the extensions 38, 38 are hung in the vehicle front-rear direction.

As shown in FIG. 7, the bulkhead lower member 34 supports the radiator 17 (see FIG. 1) at both the ends 34a, 34a of the bulkhead lower member 34 and is joined to the inner sides of the extensions 38, 38 such that the extensions 38, 38 are hung in the vehicle front-rear direction. Accordingly, the opening phenomenon can be prevented, and the rigidity for the operation stability can be provided. In addition, the specific vibration frequency of the front part of the vehicle body 11 is changed by increasing the rigidity of the entire bulkhead 16 (see FIG. 1) and hence the resonance with the engine oscillation frequency is avoided. Accordingly, the vibration can be restricted. Further, the bulkhead lower member 34 supports the radiator 17 at both the ends 34a, 34a of the bulkhead lower member 34. Accordingly, the adjustment in the height direction can be easily performed depending on the size of the radiator 17 without an additional member. Also, the recess with respect to the upper side is not provided at the extension 38 or the bottom surface 71 of the bulkhead lower member 34. Accordingly, the sectional area that can provide the rigidity for the operation stability can be maintained.

As shown in FIGS. 6 to 10, with the vehicle-body front structure, the bulkhead lower member 34 has the closed section 43 that is formed by the body portion 41 that has a U shape in sectional view and the lid 42 that closes the body portion 41 from the upper side. The bulkhead lower member 34 includes the radiator support portions 49 that extend from both the ends 34a, 34a of the bulkhead lower member 34 to the outer sides in the vehicle width direction and support the radiator 17. The radiator support portions 49 are joined to both the body portion 41 and the extensions 38.

The bulkhead lower member 34 has the closed section 43 formed by the body portion 41 and the lid 42, and the radiator support portions 49 are joined to both the body portion 41 and the extensions 38 at three members (three layers). Accordingly, a high rigidity can be provided. Further, advantages of preventing the opening phenomenon, providing the rigidity, restricting the vibration, and easily performing the adjustment in the height direction can be attained.

Also, the closed section 43 is formed by the lid 42 that closes the body portion 41 from the upper side, and the bulkhead lower member 34 includes the radiator support portions 49 that extend from both the ends 34a, 34a of the bulkhead lower member 34 to the outer sides in the vehicle width direction and that support the radiator 17 (see FIG. 1). Accordingly, the number of parts can be reduced as compared with a case in which the radiator support portions 49 are formed of additional parts.

As shown in FIG. 7, with the vehicle-body front structure, the extensions 38, 38 each have the U shape in sectional view, are joined to cover the body portion 41 from the lower side, and are arranged substantially horizontal to the bulkhead lower member 34 in front view. Accordingly, even when a layout has no space at the front and rear of the bulkhead 16, the advantages of preventing the opening phenomenon, providing the rigidity, restricting the vibration, and performing the adjustment in the height direction can be attained.

As shown in FIG. 12, with the vehicle-body front structure, each of the extensions 38, 38 includes the rear wall 73 vertically arranged at the vehicle rear side, and the substantially triangular extending portion 78 arranged at the outer side in the vehicle width direction of the rear wall 73. The extending portion 78 is joined to the vehicle rear side of the corresponding bulkhead side member 32. Accordingly, an additional reinforcing member, which are typically obliquely hung between the bulkhead side member and the bulkhead lower member, is not required, and the advantages of preventing the opening phenomenon, providing the rigidity, restricting the vibration, and easily performing the adjustment in the height direction can be attained.

Figure 14:
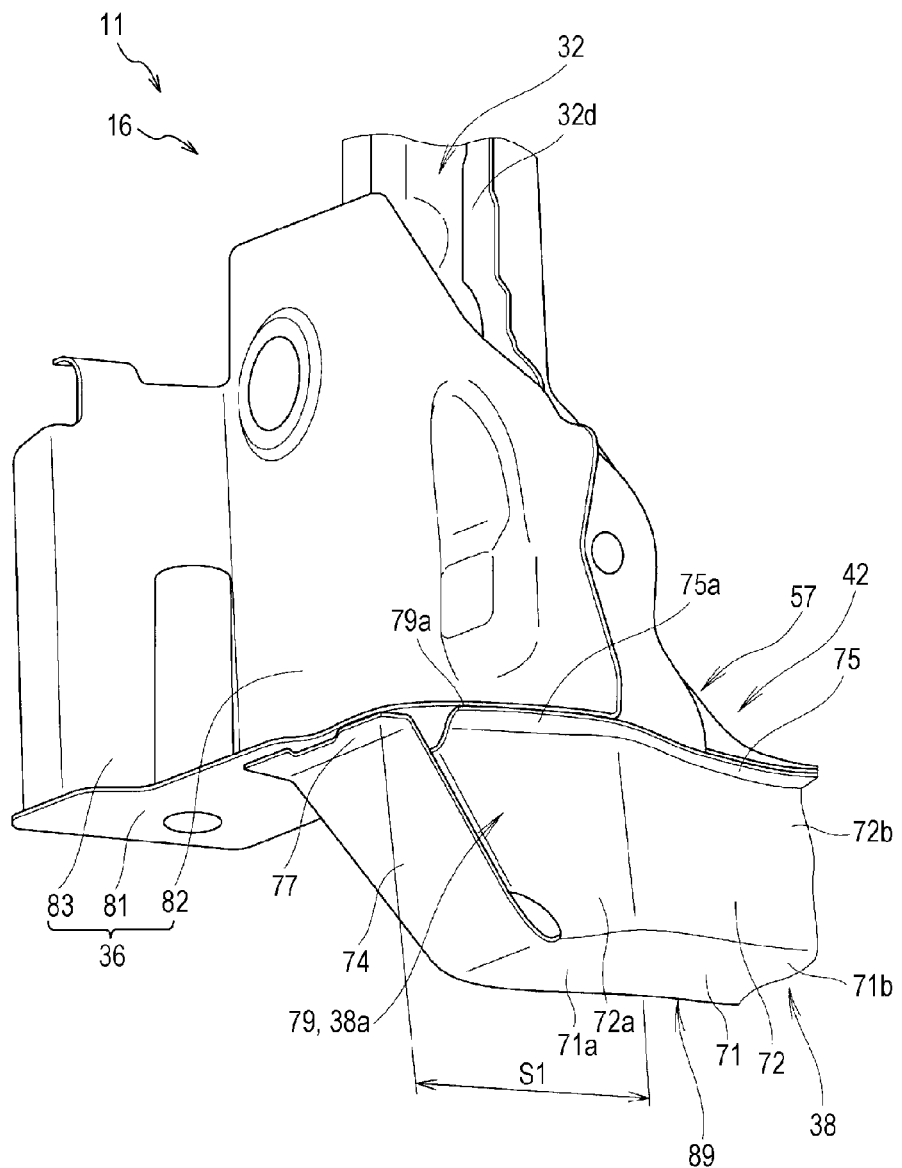
FIG. 14 is a perspective view showing the stiffener of the right bulkhead side member of the vehicle-body front structure shown in FIG. 1 when viewed from the lower front side of the vehicle body.

As shown in FIGS. 14 and 15, with the vehicle-body front structure, the bulkhead side member 32 includes the stiffener 36 that is joined to the outer side in the vehicle width direction. The each of the extensions 38, 38 includes the stiffener support portion 79 that extends to the outer side in the vehicle width direction of the bulkhead side member 32 and supports the stiffener 36 by the upper surface 79a. The stiffener 36 includes the bottom surface 81 that is joined to the upper surface 79a of the stiffener support portion 79, and the side surface 82 that is joined to the outer side in the vehicle width direction of the bulkhead side member 32.

The bottom surface 81 and the side surface 82 of the stiffener 36 are joined to the stiffener support portion 79 of the extension 38 and to the outer side in the vehicle width direction of the bulkhead side member 32. Accordingly, the advantages of preventing the opening phenomenon, providing the rigidity, easily performing the adjustment in the height direction can be further attained.

As shown in FIG. 1, in the vehicle-body front structure according to the embodiment, the radiator 17 is supported by the bulkhead lower member 34 of the bulkhead 16 of the vehicle-body front structure. However, it is not limited thereto. For example, the bulkhead lower member 34 may support a condenser of an air conditioner.

The vehicle-body front structure according to the embodiment is preferable to be employed in a passenger car, such as a sedan or a wagon.

The present disclosure is not limited to the above-described embodiment, and variations and modifications in the shape, arrangement, and number of components may be made without departing from the scope of the present disclosure.

We claim:

1. A vehicle-body front structure, comprising:
a rectangular bulkhead supporting a vehicle part provided in a front part of a vehicle body,
wherein the rectangular bulkhead includes:
first and second bulkhead side members arranged at both sides of the rectangular bulkhead respectively and extending in a vehicle up-down direction, and
a bulkhead lower member disposed at lower ends of the bulkhead side members and extending in a vehicle width direction,
wherein the bulkhead lower member includes a body portion extending in the vehicle width direction and having a smaller length than a distance between the first and second bulkhead side members, and first and second extensions disposed at both ends of the body portion, extending in the vehicle width direction, and connected to the first and second bulkhead side members respectively,
wherein the body portion supports the vehicle part at both ends thereof,
wherein the first extension includes a front wall and a rear wall extending in the vehicle width direction to cover a front side and a rear side of a longitudinal end of the body portion respectively, and the longitudinal end of the body portion is connected to the front wall and the rear wall to link inner sides of the first extension,
wherein the body portion has a U shape in cross section with an opening at a top thereof, the opening being covered by a lid such that the body portion and the lid form a closed section, the lid having a U shape in cross section and a bottom of the lid being inserted into the opening of the body portion, and
wherein the longitudinal end includes a support portion extending in the vehicle width direction and supporting the vehicle part, the support portion being joined to both the body portion and the first extension.

2. The vehicle-body front structure according to claim 1, wherein the first extension has a U shape in sectional view and is joined to the body portion from a lower direction thereof to cover a lower side of the body portion, and
wherein the first extension is disposed substantially horizontal in front view.

3. The vehicle-body front structure according to claim 1, wherein the rear wall extends vertically, and
the first extension includes a substantially triangular extending portion at an outer side in the vehicle width direction of the rear wall, the extending portion overlapping a vehicle rear side of the first bulkhead side member and being joined to the vehicle rear side of the first bulkhead side member.

4. The vehicle-body front structure according to claim 1, wherein the first bulkhead side member includes a stiffener joined to an outer side thereof in the vehicle width direction,
wherein the first extension includes a stiffener support portion extending to the outer side in the vehicle width direction of the first bulkhead side member and supporting the stiffener by an upper surface thereof, and
wherein the stiffener includes
a bottom surface joined to the upper surface of the stiffener support portion, and
a side surface joined to the outer side in the vehicle width direction of the first bulkhead side member.

5. The vehicle-body front structure according to claim 4, wherein the first extension includes a lid portion provided at a top portion thereof, the first bulkhead side member includes an inner side opposite to the outer side, the inner side of the first bulkhead side member being connected to the lid portion of the first extension.

* * * * *